April 19, 1966  W. BUEHRER  3,246,414
CORNER JOINT CONSTRUCTION AND METHOD OF MANUFACTURE THEREOF
Filed Aug. 30, 1963
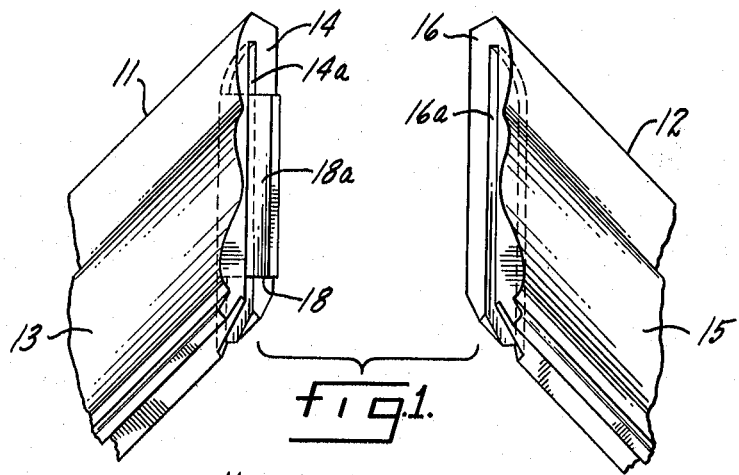
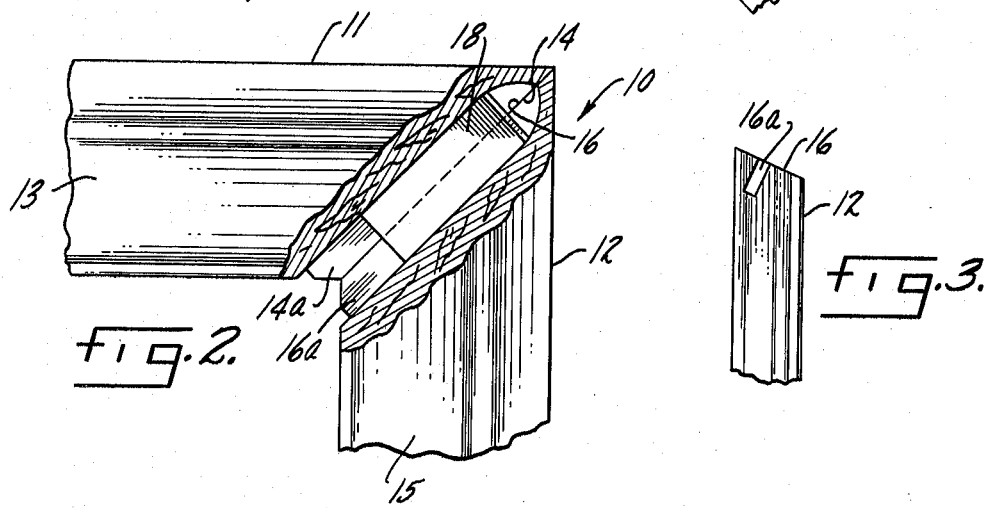
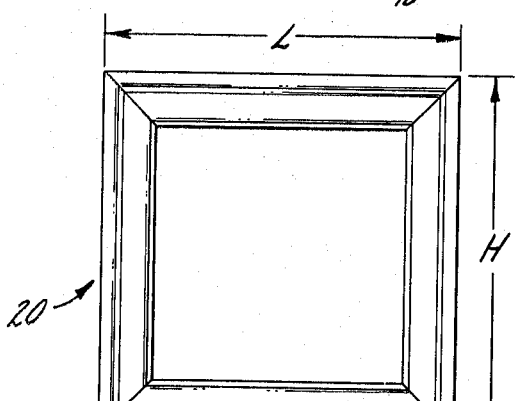
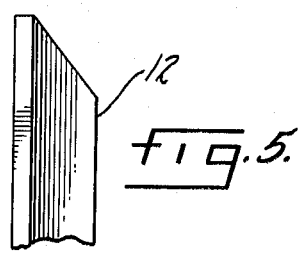
INVENTOR.
Walter Buehrer,
BY Wolfe, Hubbard, Voit & Osann
Attorneys.

United States Patent Office 3,246,414
Patented Apr. 19, 1966

3,246,414
CORNER JOINT CONSTRUCTION AND METHOD
OF MANUFACTURE THEREOF
Walter Buehrer, Chicago, Ill., assignor to Decorel Corporation, Mundelein, Ill., a corporation of Illinois
Filed Aug. 30, 1963, Ser. No. 305,717
2 Claims. (Cl. 40—152)

The present invention relates to corner joint constructions and, more particularly, to an improved corner joint construction and method of manufacture thereof. In its principal aspects, the invention is concerned with an improved corner construction, and method of making the same, which is particularly suitable for use in the assembly of picture frames or the like.

It is a general aim of the present invention to provide an improved joint construction, and method of manufacture thereof, characterized by its simplicity and ease of assembly, yet which is sturdy and reliable in use. While not so limited in its application, the invention will find especially advantageous use in connection with the erection of wooden picture frames or the like of the type employing side pieces which project outwardly relative to the plane of the rear surface of the frame.

Accordingly, a related object of the invention is to provide an improved picture frame, and method of making the same, which permits ease of assembly by untrained as well as trained personnel.

In another of its important aspects, it is an object of the invention to provide an improved side piece for picture frames or the like which may be readily assembled with a similar side piece of the same or different length to form an angular corner. As a consequence of attaining this objective, component side pieces may be manufactured and marketed having diverse lengths, thus permitting fabrication by the consumer of a frame having desired dimensions by the simple expedient of selecting two pairs of side pieces of preselected lengths and joining them to form a generally rectangular frame.

An ancillary object of the invention is the provision of an improved joint construction which has a smooth finished appearance and wherein the connecting member is concealed from sight when the joint is assembled.

A more specific object is to provide an improved joint construction which requires relatively few component pieces and which can be readily assembled without the use of hammers or other special tools, yet which permits economical fabrication from readily available materials.

Other objects and advantages of the invention will become apparent as the following description proceeds, taken in conjunction with the accompanying drawing, in which:

FIGURE 1 is an exploded perspective view depicting portions of two frame side pieces adapted to be joined together to form a generally right-angular corner joint construction embodying the features of the present invention;

FIG. 2 is a fragmentary, cut-away front elevation of the assembled joint;

FIG. 3 is a plan view of a fragment of one of the side pieces illustrating the end thereof;

FIG. 4 is a front elevation on a reduced scale of an exemplary frame, here shown as a picture frame, embodying the features of the present invention; and FIG. 5 is a fragmentary side elevation of the frame in FIG. 4.

While the invention is susceptible of various modifications and alternative forms, a specific embodiment thereof has been shown by way of example in the drawing and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

Referring now to the drawing, there is illustrated (FIG. 2) an improved corner joint, generally indicated at 10, embodying the features of the present invention. As best shown in FIG. 1, the joint is formed of a pair of elongated side pieces 11 and 12 adapted to be joined together with ends thereof abutting in angular relationship. The exemplary side piece 11 includes a main body portion 13 having an oblique end 14, i.e., the end is disposed in a plane angularly displaced from a plane perpendicular to the edges of the body portion 13. In like manner, the side piece 12 also includes a main body portion 15 having an oblique end 16. In the illustrative corner joint, both oblique ends 14 and 16 are angularly displaced 45° so that when they are joined together (FIG. 2), they will form a generally right angular (90°) joint. Of course, those skilled in the art will appreciate that the mating oblique ends could have other than 45° angles and, when assembled, could form other than a right angular joint.

In the fabrication of picture frames or the like, it is often desirable to form the corner joints so that the outer frame edge is raised above or projects outwardly from the inner edge when the joints are positioned flush against a flat surface (FIG. 5). In the exemplary construction, this is accomplished by forming the oblique ends 14, 16 with beveled or canted surfaces, as best shown in FIGS. 1 and 3. As a consequence of this construction, when the ends 14, 16 of the side pieces are placed in face-to-face abutting or mating relation, a joint construction, such as that illustrated in FIG. 5, is provided.

In accordance with one of the important aspects of the present invention, the side pieces 11, 12 and, more particularly, the mating oblique beveled ends 14, 16 thereof, are formed so that they may be readily joined together in a sturdy joint 10 which is substantially devoid of any visible connecting means. To this end, the oblique ends 14, 16 have respectively formed therein transverse grooves 14a, 16a which are disposed in planes perpendicular to the planes of the corresponding beveled ends. In the illustrative form of the invention, the grooves 14a, 16a extend from the inner edges of the side pieces outwardly to a point short of the outer edges thereof. Thus, when the side pieces are abutted with their ends 14, 16 in face-to-face relation, the grooves are effectively concealed from view.

In carrying out the present invention, provision is made for securing the side pieces 11, 12 together in a smooth rigid joint 10 with the faces of the body portions 13, 15, which are normally contoured, blending into one another. To this end, an insert member 18 is provided having a width corresponding approximately to the width of the grooves 14a, 16a, the insert member being preferably formed of wood, fiberboard, or similar fibrous material. The insert member 18 is positioned in a groove in one of the side pieces and is firmly secured therein as, for example, by use of a suitable adhesive. In the illustrative embodiment (FIG. 1), the insert member 18 is disposed and secured in the groove 14a of the side piece 11 so that a projecting tongue portion 18a extends outwardly from the beveled, oblique end 14 in a plane perpendicular to the surface thereof. In order to complete the corner joint 10 (FIG. 2), a suitable adhesive material may be placed on the projecting tongue portion 18a (FIG. 1) of the insert and the side pieces 11 and 12 may then be connected together by moving the ends 14 and 16 into abutting face-to-face relationship so that the tongue portion 18a extends into the groove 16a.

Those skilled in the art will appreciate from the foregoing description that each side piece, for example, side piece 11, is preshaped with its opposite extremities cut obliquely so as to converge toward the inner edge of the side piece. The opposite oblique ends of each side piece are then beveled so that the planes of the ends converge toward the exposed face of the frame. Both beveled oblique ends of each side piece are then grooved in the manner previously described and an insert 18 is secured in one grooved end.

The foregoing arrangement is particularly advantageous in that it permits the fabrication of finished frames having virtually any desired dimensions. For example, let it be assumed that a picture frame such as that shown generally at 20 in FIG. 4 is to be assembled. As here illustrated, the exemplary frame 20 has a length L and a height H, it being understood that the dimensions L and H may be identical or either one may exceed the other, dependent upon the size and shape frame desired. To assemble the frame 20, it is merely necessary to select four (4) side pieces of the type embodying the invention, two having a dimension L and the other two having a dimension H. An adhesive material is then placed upon the projecting portions 18a of the insert members extending from a corresponding end of each side piece. The projecting portions 18a on the pieces having a dimension L are inserted into the grooves formed in the oblique, beveled ends of the pieces having a dimension H, while the projecting portions 18a on the latter pieces are inserted into the grooves in adjacent ones of the former pieces. The associated beveled ends are then moved into face-to-face abutting relation so that a unitary frame is formed. Thus, it will be apparent that a frame having any desired shape or size may be formed simply by selecting the proper lengths L and H and assembling the side pieces as set forth above.

Since the grooves do not extend to the outside edge of the side pieces, it will be apparent that neither the grooves nor the insert members are visible when a frame or joint has been assembled.

Of course, while the invention has herein been described in connection with a joint construction for frames, and a method of manufacture thereof, wherein an interconnecting insert member 18 is positioned at one end only of each side piece, other arrangements could be employed and still fall within the spirit and scope of the appended claims. For example, it would be feasible to place the inserts into the grooves formed in each end of one oppositely disposed pair of side pieces such as the pair in FIG. 4 having the dimension L. In this instance, the pair having the dimension H would simply have grooves formed therein to receive the projecting portions 18a. Additionally, the insert members 18 could be inserted in the grooves subsequent to the ends of the side pieces being moved into abutting relation. Under such conditions, the ends would be moved into abutment with the grooves alined, an adhesive material would be placed on an insert member, and the insert member would be slid into the alined grooves from the interior of the frame or joint since the grooves extend to the inner edges of the side pieces.

I claim as my invention:

1. In a picture frame joint which comprises, in combination, a pair of elongated side pieces having oblique mating ends, said ends being beveled to cause the outer edges of said elongated side pieces to project outwardly from the inner edges when the oblique mating ends are in face-to-face mating relationship, said side pieces having means for receiving and holding the sides of a picture to be mounted therein, a transverse groove formed in each beveled end in a plane perpendicular thereto, the grooves extending from the inner edges of the side pieces to corresponding points short of the outer edges thereof and being formed so as to be in planar alinement when the beveled ends are in face-to-face mating relationship, and an insert member disposed within the grooves and secured thereto by an adhesive material so that the beveled ends are held in abutment and the side pieces are rigidly connected together, the insert member and the grooves being concealed from view.

2. A picture frame or the like which comprises, in combination, a first pair of side pieces having a length L, a second pair of side pieces having a length H, said side pieces having means for receiving and holding the sides of a picture to be mounted therein, each side piece terminating in oblique ends which converge toward one another adjacent the inner edge thereof, the oblique ends of each side piece being beveled so as to converge toward one another adjacent the outer face of the respective side piece whereby the outer edges of said elongated side pieces project outwardly from the inner edges when the oblique ends are in face-to-face mating relationship, a groove formed in each beveled oblique end in a plane perpendicular thereto, the ends of each side piece having a length L adapted to be placed in face-to-face abutment with the associated ends of the adjacent side pieces having a length H with the grooves therein alined, and insert members disposed within the grooves of associated ends for holding the side pieces in abutment so that a unitary frame construction is provided.

References Cited by the Examiner

UNITED STATES PATENTS

| | | | |
|---|---|---|---|
| 372,695 | 11/1887 | Berritt | 20—92 |
| 916,553 | 3/1909 | Heap | 20—92 |
| 944,601 | 12/1909 | Davison | 40—152 |
| 1,416,901 | 5/1922 | Smith | 20—92 |
| 1,585,765 | 5/1926 | Chitra | 40—152.2 |

FOREIGN PATENTS 1,175,665  11/1958  France.

EUGENE R. CAPOZIO, *Primary Examiner.*

JEROME SCHNALL, *Examiner.*

WENCELSO J. CONTRERAS, *Assistant Examiner.*